2 Sheets—Sheet 1

S. TALLY.
Combined Harrow and Sod-Cutter.

No. 218,332. Patented Aug. 5, 1879.

Witnesses:
Saml R. Turner
D. P. Cowl

Inventor:
Stephen Tally
by McFarland & Nottingham
Attys

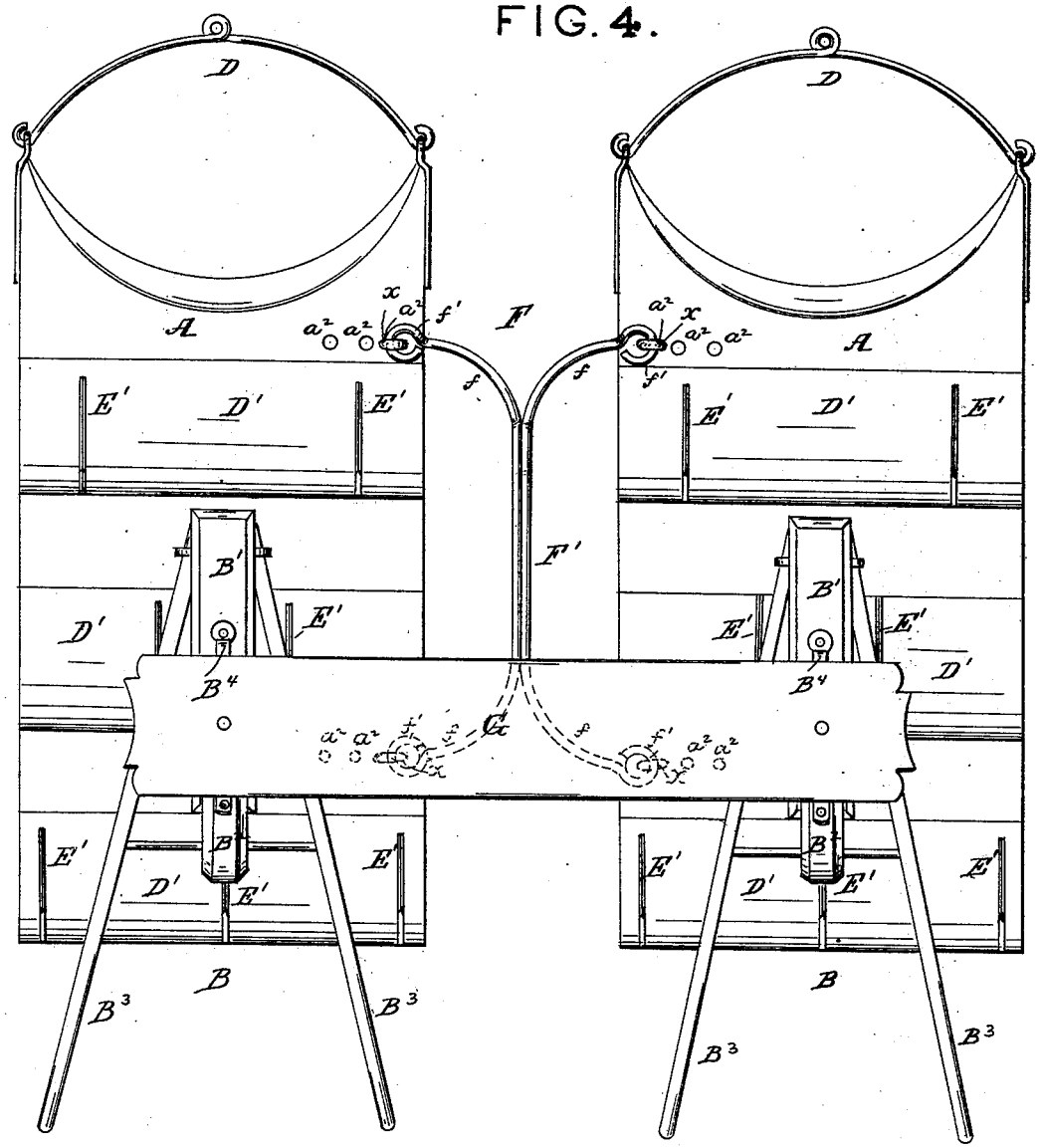

UNITED STATES PATENT OFFICE.

STEPHEN TALLY, OF LEWISBURG, TENNESSEE.

IMPROVEMENT IN COMBINED HARROW AND SOD-CUTTER.

Specification forming part of Letters Patent No. 218,332, dated August 5, 1879; application filed June 6, 1879.

*To all whom it may concern:*

Be it known that I, STEPHEN TALLY, of Lewisburg, in the county of Marshall and State of Tennessee, have invented certain new and useful Improvements in Combined Harrow and Sod-Cutter; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a reversible interchangeable harrow and sod-cutter; and the novelty consists in the construction and arrangement of parts, as will be more fully hereinafter set forth, and pointed out in the claims.

In carrying out my invention, I employ a body provided with laterally-inclined bearing-plates, rigid therewith. An ordinary draft-whiffletree or other proper draft-connection is provided, and also proper sockets for plow-handle spindles.

The body may be made of any suitable material or size; but, to adapt it to a cheap and simple agricultural implement, I prefer to form it of one or more planks, of proper thickness to form a firm bearing for a peculiar tooth, which will be hereinafter described.

The plow-handle sockets are of such a nature as to receive the plow-spindles upon either side, and provisions are made to couple two of the bodies together, and a brace from the plow-standards forms a bearing for a riding-seat when more weight is required, as shown upon each side.

The operating-tooth is adapted to serve rigidly in the body, and is constructed with a body or cutting-surface, having a lug for steadying the tooth. At right angles therefrom is a harrow-tooth, of sufficient length to pass through the body and operate as a harrow-tooth upon the opposite side.

The lug fits into a recess in the inclined plates, and the inclined cutting-surface of the knife serves to sever sods and the like with a draw-cut.

The coupling device is loosely attached to each body, both forward and rear, and the four shanks extend upward, where they are connected, giving a vibratory motion to the parts. By this method of coupling the parts together both sides of a row can at the same time be cultivated through, and by the vibratory motion the parts accommodate themselves to either a ridge bed or hollow.

Figure 1:
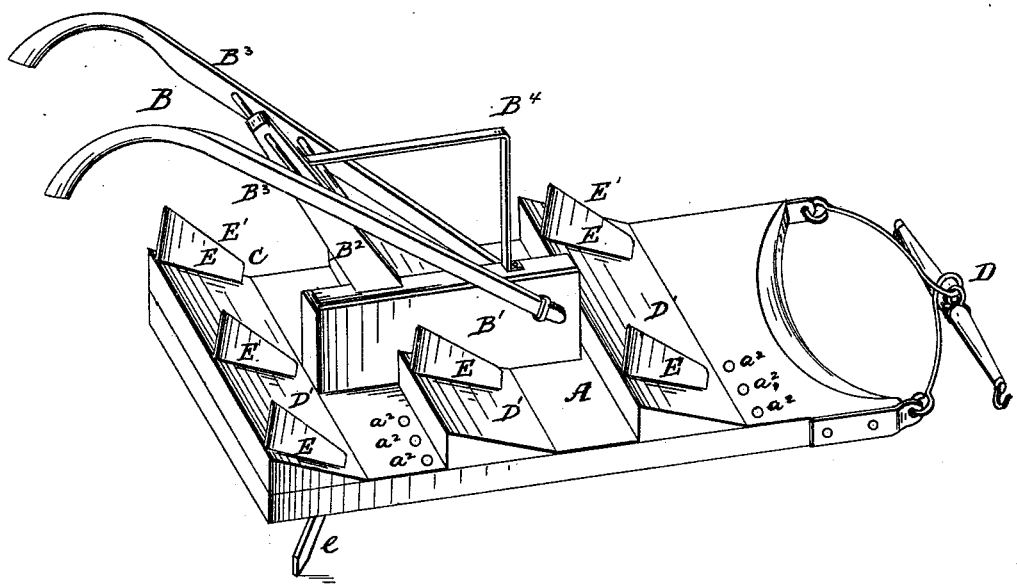
Figure 2:
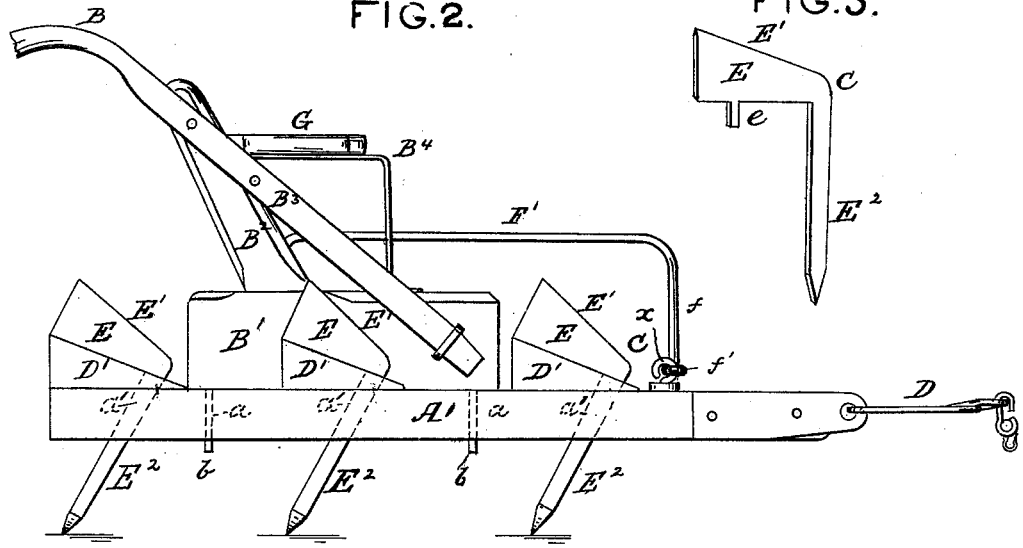
Figure 3:
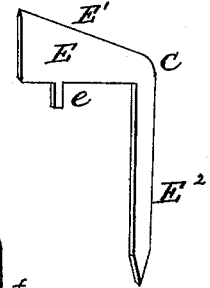

In the accompanying drawings, Figure 1 represents a perspective view of one of my improved harrow and sod-cutters; Fig. 2, a side elevation of the same; Fig. 3, a view of one of the teeth detached; and Fig. 4, a top-plan view of the two combined, showing the coupling device.

Referring to the drawings, the letter A represents the body, having sockets $a$ to receive the spindles $b$ of plow-handles B, bearings $a^1$ to receive the double teeth C, and apertures $a^2$ to receive the coupling-bolts $x$.

The plow-handles B are composed of a body, $B^1$, standard $B^2$, and handles $B^3$. From the body $B^1$ spindles $b$ are secured, which operate in the sockets $a$, as shown, and an elbow, $B^4$, with a horizontal upper surface, extends from the standard to the body.

The letter D represents the draft-connection, and $D^1$ the inclined plates, said plates being provided with recesses to receive a lug, $e$, upon the tooth. This tooth is formed of one piece of metal, and consists of the body E, having an inclined cutting-surface, $E^1$, and a harrow-tooth, $E^2$, at approximately right angles therewith. The lug $e$ is part of the body E, and serves as shown.

The letter F represents the coupling, which consists of the body $F'$ and quadruple arms $f$, with eyes $f'$, as shown.

A seat, G, is adapted to rest upon or be secured to the elbow $B^4$, when two of the reversible devices are connected together.

It will be observed that one or two of the devices may be secured together when desired; that each body has a readily-adjustable handle; that each body is reversible, so as to provide two implements in one, and that it is either a walking or riding device, as shown.

It will also be observed that the front of the body or platform is in form semicircular. This is for the purpose, in cultivating corn or cotton, of catching clods and trash, and so draw it from the row, which the points of the semicircle do.

What I claim, and desire to secure by Letters Patent, is—

1. The reversible tooth C, consisting of the body E E¹, tooth E², and lug e, substantially as described.

2. The reversible tooth C, consisting of the body E E¹, tooth E², and lug e, in combination with the reversible body A a and plates D′, substantially as specified.

3. The coupling F and connecting devices, combined with the bodies A a, reversible handle B, and double teeth C, as set forth.

4. The bodies A a a¹, teeth E E¹ E² e, the inclined plates D′, the handles B B¹ B² B³, and elbow B⁴, combined with coupling F f f′ and seat G, as shown, for the purpose specified.

In testimony that I claim the foregoing as my own I affix my signature in presence of two witnesses.

STEPHEN TALLY.

Witnesses:
 JAMES HENDRIX.
 MOSES SHARP.